(No Model.) 5 Sheets—Sheet 1.

G. H. CUSHMAN & E. H. TAYLOR.
PAPER BOX MAKING MACHINE.

No. 418,690. Patented Jan. 7, 1890.

WITNESSES
Fred. S. Greene
Frederick L. Emery

INVENTORS
George H. Cushman,
Eugene H. Taylor,
By Crosby & Gregory
Attys.

(No Model.) 5 Sheets—Sheet 2.

G. H. CUSHMAN & E. H. TAYLOR.
PAPER BOX MAKING MACHINE.

No. 418,690. Patented Jan. 7, 1890.

WITNESSES
Fred S. Greenleaf
Frederick L. Emery

INVENTORS
George H. Cushman
Eugene H. Taylor (No Model.) 5 Sheets—Sheet 5.

G. H. CUSHMAN & E. H. TAYLOR.
PAPER BOX MAKING MACHINE.

No. 418,690. Patented Jan. 7, 1890.

WITNESSES
Fred. S. Greenleaf
Frederick L. Emery.

INVENTORS
George H. Cushman,
Eugene H. Taylor,
By Crosby & Gregory Attys.

UNITED STATES PATENT OFFICE.

GEORGE H. CUSHMAN AND EUGENE H. TAYLOR, OF LYNN, MASSACHUSETTS, ASSIGNORS, BY MESNE ASSIGNMENTS, TO THE CUSHMAN PAPER BOX MACHINE COMPANY, OF PORTLAND, MAINE.

PAPER-BOX-MAKING MACHINE.

SPECIFICATION forming part of Letters Patent No. 418,690, dated January 7, 1890.

Application filed June 13, 1888. Serial No. 276,995. (No model.)

*To all whom it may concern:*

Be it known that we, GEORGE H. CUSHMAN and EUGENE H. TAYLOR, both of Lynn, county of Essex, and State of Massachusetts, have invented an Improvement in Paper-Box-Making Machines, of which the following description, in connection with the accompanying drawings, is a specification, like letters and figures on the drawings representing like parts.

This invention has for its object to improve the construction of machines for the manufacture of paper boxes, whereby the same as well as the covers may be accurately and quickly made.

In our improved machine the blanks from which the boxes are to be made are placed in position between guides located above a tank containing wetting devices or wetters and pasting devices, the wetting devices rising at the proper times against the under side of the blank supported between its ends on tracks, the wetters wetting or moistening each blank transversely and longitudinally, or in the lines on which the blank is to be subsequently folded, to form the flanges or sides of the box or cover, the flanges being of greater or less width, according to the depth of the box or cover to be made. The pasting devices rise and apply paste to parts of the blank to be turned over, so that other parts of the flanges may be pasted to them. The blanks, after having been wet and pasted, are fed one after another from the bottom of a pile of blanks by a feeder which pushes the said blanks forward along narrow tracks. Suitable plates or wings are shown by which to keep the blank down on the tracks. The blank, having been wet, is engaged by the feeder and moved into position between a "former" and a follower, both of which, suitably guided, are made vertically movable together with relation to the bed of the machine, or to the tracks referred to, to thereby carry a part of the wet blank caught between them into a space between side and end plates or wipers, preferably made adjustable and supported, as herein shown, by the head of the machine, the said side and end plates or wipers, by the action of the said blank against them, turning the side and end flaps of the blank over upon the former. The blank is slotted at its ends to form corner-flaps, which are acted upon by lip-turning devices, which turn the corner flaps at right angles to the blank, the former, as it rises with the blank, taking with it the follower, the former and follower together acting to move the blank held by them past side and end plates or wipers, which act in succession to cause the side and end flaps of the blank to be wiped or turned down upon the sides of the former, the flanges or edges of the blank which are to constitute the sides of the box or cover being herein represented as first turned down, after which lip-holders are thrown in to clasp the corner flaps snugly about the corners of the former, and the end flanges being turned by the further rise of the former. The side and end flanges having been turned down against the former, the upward movement of the follower is arrested. The former is made in two halves or is divided transversely.

One feature of our invention comprehends the organization, in a machine for the manufacture of paper boxes, of the following instrumentalities, viz: guides to position the blanks to be made into a box or cover, wetters to wet the blank in the lines in which it is to be folded, and a former and a follower-plate, both located at a distance from the said guides and wetters, and pasting mechanism to paste the blank, combined with feeding mechanism to feed the wet blanks from the wetters into position between the said former and follower-plate.

With the devices just mentioned we have combined operative mechanism, as will be described, whereby the said parts are actuated in the proper time and order.

Our invention also consists in the combination, in a machine for the manufacture of paper boxes, of the following instrumentalities, viz: wetters to wet the paper in the lines where it is to be folded and a former and follower located at a distance from the wetters, combined with feeding mechanism to move the wet paper from the wetters into position between the said former and follower to be folded on the lines in which the paper was wet, as will be hereinafter described.

Other features of our invention will be hereinafter described, and pointed out in the claims at the end of this specification.

Figure 1 is a top or plan view of a machine embodying our invention, a portion of the head of the machine at the delivery end thereof being removed between the dotted lines $x$ and $x^2$, Fig. 5, the former, one-half of which is shown in the said figure, being in horizontal section in the line $x^5$, Fig. 5, the said figure showing but a small number of the pasters to be used, it being understood that a greater or less number of pasters may be used, according to the quantity of paste to be applied to the blank and the particular spots where the paste is to be applied; Fig. $1^a$, a detail of the plate at the end of the feeder; Fig. $1^b$, a detail of the guide to control the pile of blanks. Fig. 2 is a detail showing one pair of lip-turners and the plate to which they are attached; Fig. 3, a detail top view of a portion of the wetting devices or wetters and their holding-frame. Fig. 4 is a detail in the line $x^{20}$, Fig. 1, to be described. Fig. 5 in elevation shows the delivery end of the machine, together with the portion of the head omitted from Fig. 1, the machine being partially broken out at the right of the said figure to better show the construction of some of the parts; Fig. 6, a detail showing a portion of the head in the line $x^3$, Fig. 5, the said section also showing in elevation the lip-turners and corner-holders. Fig. 7 is a section in the line $x^4$, looking to the right, one end plate or wiper being broken out, one of the lip-turners and corner-holders being omitted; Fig. $7^a$, a partial sectional detail in the line $x^{21}$, Fig. 6. Fig. $7^b$ is a partial vertical section broken through one end of the former and also through one of the long slots 17 of the plate carrying the lip-turners; Fig. $7^c$, a partial inner side view of the plate carrying the lip-turners to show the spring-plates attached thereto to clear the ends of the former from paste which may adhere thereto; Fig. 14, a longitudinal vertical section of most of the machine in the dotted line $x$, Fig. 5. Fig. 15, just above Fig. 14, is a vertical longitudinal sectional detail taken through one of the paste-pans, the tank, and the paster-actuating devices, the pasters being omitted, they being shown on a larger scale in other figures, the section being in the line $x^{12}$, Fig. 1. Fig. 16 is a front view, partially broken out, of the gage shown in place in Fig. 39 and in section in Fig. 38. Fig. 18 is a detail showing a stop to prevent retrograde movement of the blank; Fig. 23, a detail section showing on a large scale portions of the water-pan and cover therein to prevent the steam rising injuriously against the blank. Fig. 36, a cross-section thereof, but bottom side up; Fig. 37, a longitudinal section, bottom side up, of the box.

Figures 14, 15, 16, 18:
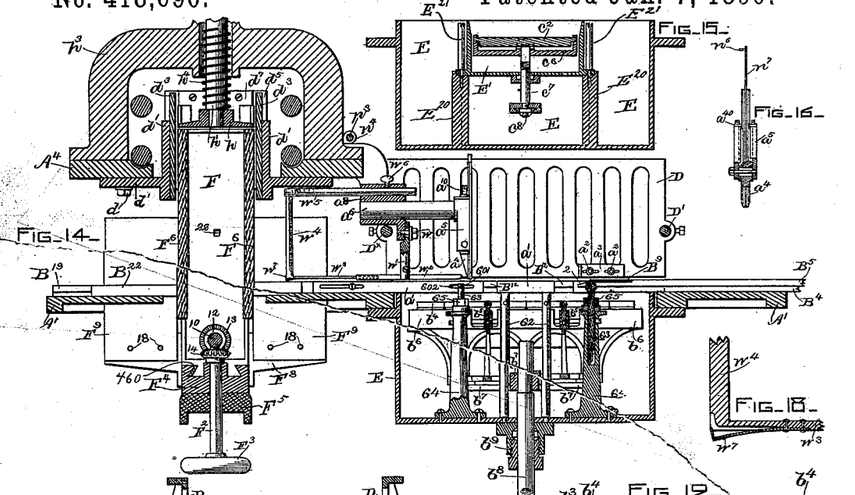

The side frames A of the machine, united by suitable cross-braces, support a bed-plate $A'$, and each side frame has a stationary rod $A^2$ connected to it by a suitable nut $A^3$. (See Fig. 5.) The threaded upper end of the said rods $A^2$ are extended through bosses of a plate $A^4$, which we call the "head," the said plate being held on the said rods between nuts $A^5$ $A^6$, the latter being shown in Fig. 8. The frame-work has suitable bearings for the working parts, to be described. The driving-shaft $A^6$ has upon it a suitable pulley $A^{6\times}$, over which is passed a driving-belt. (Not shown.) The shaft $A^6$ has (see Fig. 8) a pinion $A^7$, which engages a large gear $A^8$, fast upon the main shaft $A^9$, to which are secured the cams $A^{10}$ and $A^{12}$, the said shaft also having attached to it suitable counter-balances, as $A^{13}$, (see Fig. 5,) to counterbalance the weight of the cross-head and former, (to be described,) to be actuated by the cranks $A^{14}$ $A^{15}$ on the ends of the said shaft $A^9$. The cam $A^{10}$ receives in it a roller or other stud $a$ on a slide-bar B, slotted to slide upon the said shaft, the outer end of the said slide-bar being jointed to an arm $B'$ of a rock-shaft $B^2$, having its bearings in the frame, the said rock-shaft having arms $B^3$, the upper ends of which are connected loosely with pins held in ears $B^4$ (see Figs. 1 and 8) of the frame $B^4$, (shown best in Fig. 1,) to which is adjustably attached the feeder $B^5$, the said feeding-frame $B^4$ being reciprocated horizontally back and forth in suitable guide-ways, as shown, by breaking out the plate $A'$ in Fig. 1. The feeder $B^5$ is adjustably connected with the feeder-frame by means of bolts $B^6$ in slots $B^7$ of the feeder, this adjustment being necessary in order to adapt the position of the forward end of the feeder to the width of the blank C to be acted upon. The feeder is slotted centrally, as at $B^8$, (see Fig. 1,) to enable it to pass the central track $a'$, the same being divided into several sections, chiefly to let the wetting devices pass up between the sections from below. The forward end of the feeder $B^5$ is beveled, as at 2, (see Fig. 14,) so as to readily pass under the blank, the said feeder immediately back of its beveled front end 2 having attached to it plates $B^9$ $B^{10}$, (see Fig. 1,) the front edges of the said plates meeting one of the long sides of the blank, as at 200, (see Fig. 28,) it being supposed that the said blank is moving in the direction of the arrow thereon, the edges of the said plates which come in contact with the edge of the blank being provided with prongs, as shown best in the detail, Fig. $1^a$, to enter and prevent the slipping of the blank while being fed. The plates $B^{10}$ are attached to the feeder by suitable screws, the feeder in practice having a number of screw-threaded holes to receive the said screws in order that the plates $B^{10}$ may be moved more or less laterally to enable their outer ends to bear upon the tracks $B^{12}$, which tracks determine the horizontal plane in which the feeder slides, the said tracks also serving to support the blank to be fed forward by the feeder between the points where the blank is wet and where it is pasted, or just outside the line upon which the blank will be folded to constitute the ends of box or cover.

Figures 17, 19, 20, 21, 22:
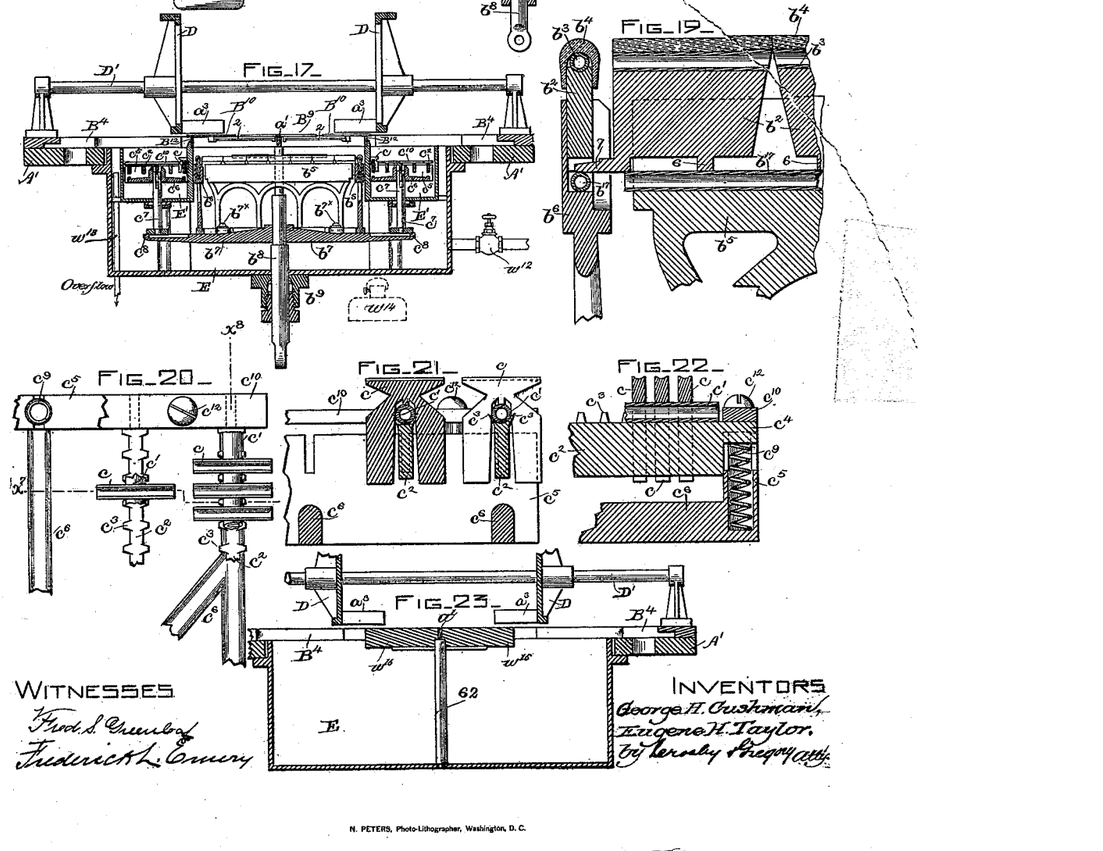
Fig. 17 is a cross-section of most of the machine in the line $x'$, Fig. 1, to show the wetting and pasting devices, the guide for positioning the blank, the tracks, and blank-feeder.
Fig. 19, an enlarged section of the wetting devices.
Figs. 20, 21, and 22, details of the pasters and their supporting devices, the line of section for Figs. 21 and 22 being in the lines $x^7 x^8$ of Fig. 20.
Figures 24, 25, 26, 27, 28, 29, 33, 34, 35, 38:
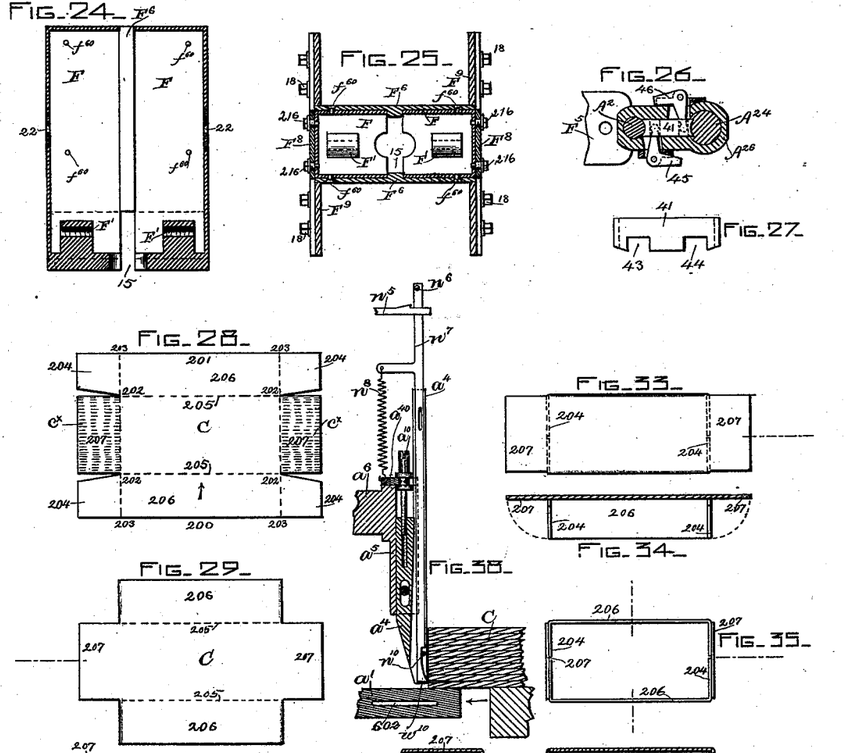
Fig. 24 is a vertical cross-section of the independent adjustable blocks comprising the chief parts of the former.
Fig. 25, a detail in horizontal section in about the line $x^{25}$, Fig. 5, of the former and its attached end plates or wipers, together with the connecting-plates by which to determine the effective size of the former, the said connecting-plates being of greater or less length and thickness, according to the length or width of the box to be made.
Fig. 26, a sectional detail in line $x^{24}$, Fig. 5, of the end of the cross-head holding the former, the said figure showing the locking device by which to hold and release the said cross-head at the proper times, as will be described.
Fig. 27, a side elevation of the bolt of the locking device removed from Fig. 26.
Fig. 28 shows a blank prepared to be placed in position in the machine, the said figure by dotted lines showing the lines in which the blank is wet preparatory to folding the same, the fine parallel lines showing the pasted portions.
Fig. 29 shows the blank with the lip turned down.
Fig. 33, a top view showing the corner flaps or lips as they will appear when turned against the former by the corner-flap holders.
Fig. 34, a section of Fig. 33.
Fig. 35, an interior view of the box.
Fig. 38 is an enlarged vertical sectional detail showing the gage for stopping all but the undermost blank and part of the central track over which the wet blank is fed by the feeder, (not shown in the said figure;) Fig. 39, a plan view of the gage to prevent the removal, except singly, of the endmost blank of the pile of blanks and devices co-operating therewith to be described.
Figures 36, 37, 39:
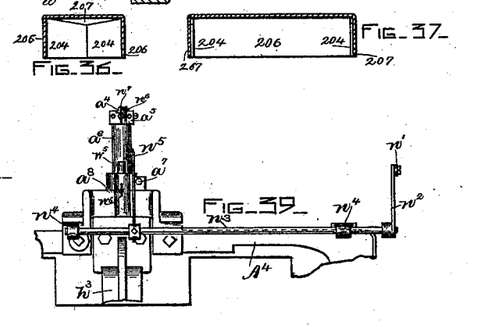

The blanks C, of paper board, all properly notched, as in Fig. 28, are placed in a pile between suitable guides D, (shown as plates,) suitably secured in adjustable manner upon guide-rods $D'$ $D^*$, there being two guide-rods $D^*$, one in line with the other, the said guide-rods being supported in suitable stands erected upon the flanged portion of the bed-plate $A'$, in which slides the feeder-frame $B^4$. Each plate D has adjustably connected with it, by screws $a^2$, (see Figs. $1^b$ and 14,) stops $a^3$, which determine the position to be occupied by the edge 200 of the blank nearest the feeding end of the machine, the said plates D receiving between them a gage-finger $a^4$, (see Figs. 14 and 38,) which is fitted within the head $a^5$ of a rod $a^6$, which in practice will be firmly clamped in position in a split bearing formed as a part of a bracket $a^8$, the split bearing being clamped upon the rod $a^6$ by a screw, as $a^7$, (see Fig. 39,) so that the rod may be adjusted horizontally, according to the width of the blank C. The gage $a^4$ is made vertically adjustable in the head $a^5$ of the rod $a^6$ by means of a screw $a^{10}$, it having a collar grooved annularly and entered by a lug $a^{40}$, so that the screw cannot move longitudinally, the threaded portion of the screw entering a threaded hole in the gage $a^4$, thus permitting the gage to be adjusted vertically, so that but one blank can be moved forward under it at the same time, the gage being adjustable to occupy a higher or lower position, according to the thickness of the blank. The tracks $B^{12}$ before referred to are made in sections, portions of the said tracks being connected with the upper portion of each paste-pan $E'$ along its inner edge, as best shown in Fig. 17, other portions of the track in continuation thereof (see Fig. 1) being attached by suitable screws or otherwise to the inner edges of plates $B^{19}$, connected adjustably to the bed-plate by bolts $B^{20}$, (see the detail, Fig. 4,) the said plates $B^{19}$ for a portion of their length at their under sides being grooved, as at $B^{40}$, (see Fig. 4,) to receive the flanged portions $B^{21}$ of the filling-plates $B^{22}$, (see Figs. 1 and 5,) made longitudinally adjustable with relation to the plate $B^{19}$ by screws $B^{23}$ in slots of the plate $B^{19}$. (See Fig. 1.) When the bolts $B^{20}$ are loosened, the plates $B^{19}$ and $B^{22}$ may be adjusted laterally together or as one piece upon or with relation to the bed-plate $A'$ of the machine to adapt the machine for a longer or shorter box, the adjustment of the plates $B^{22}$ longitudinally upon the plate $B^{19}$ providing for variations in the width of the box.

Figures 1, 1A, 1B, 2, 3, 4:
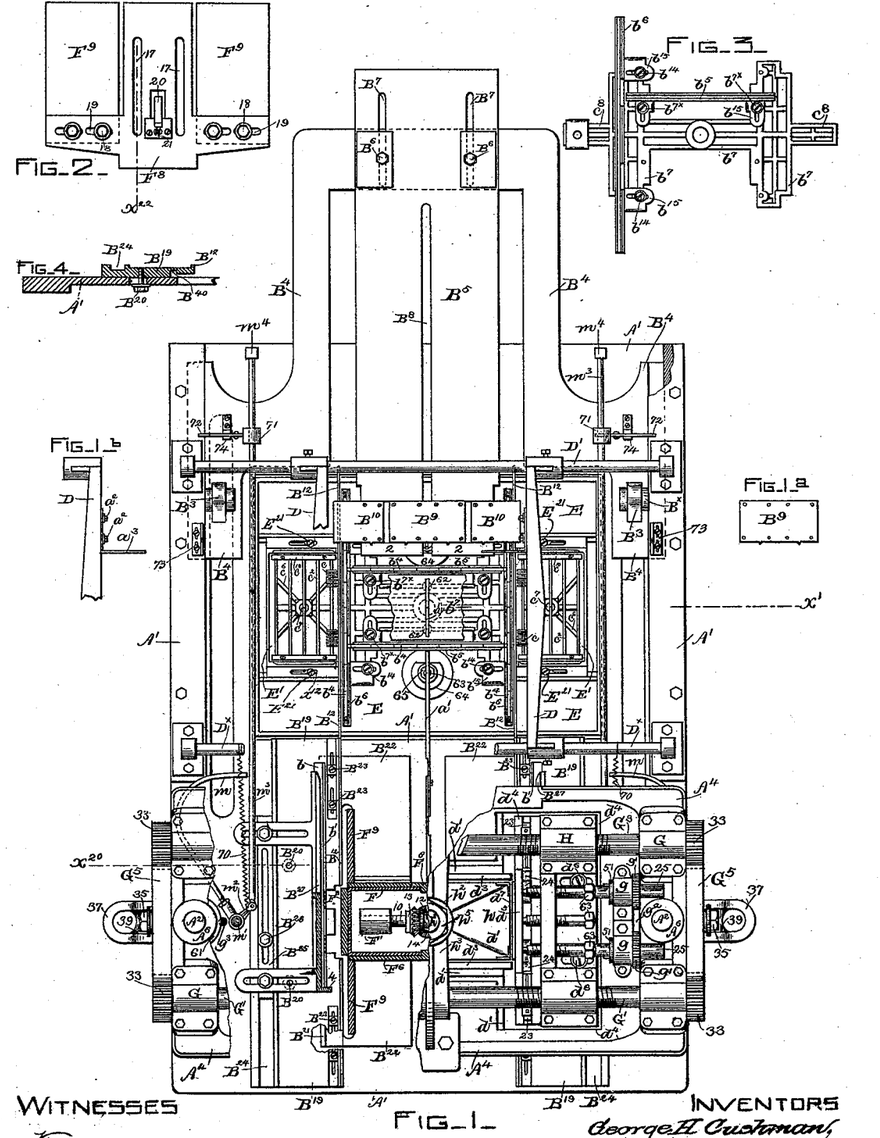
Figures 5, 6, 7, 7A, 7B, 7C:
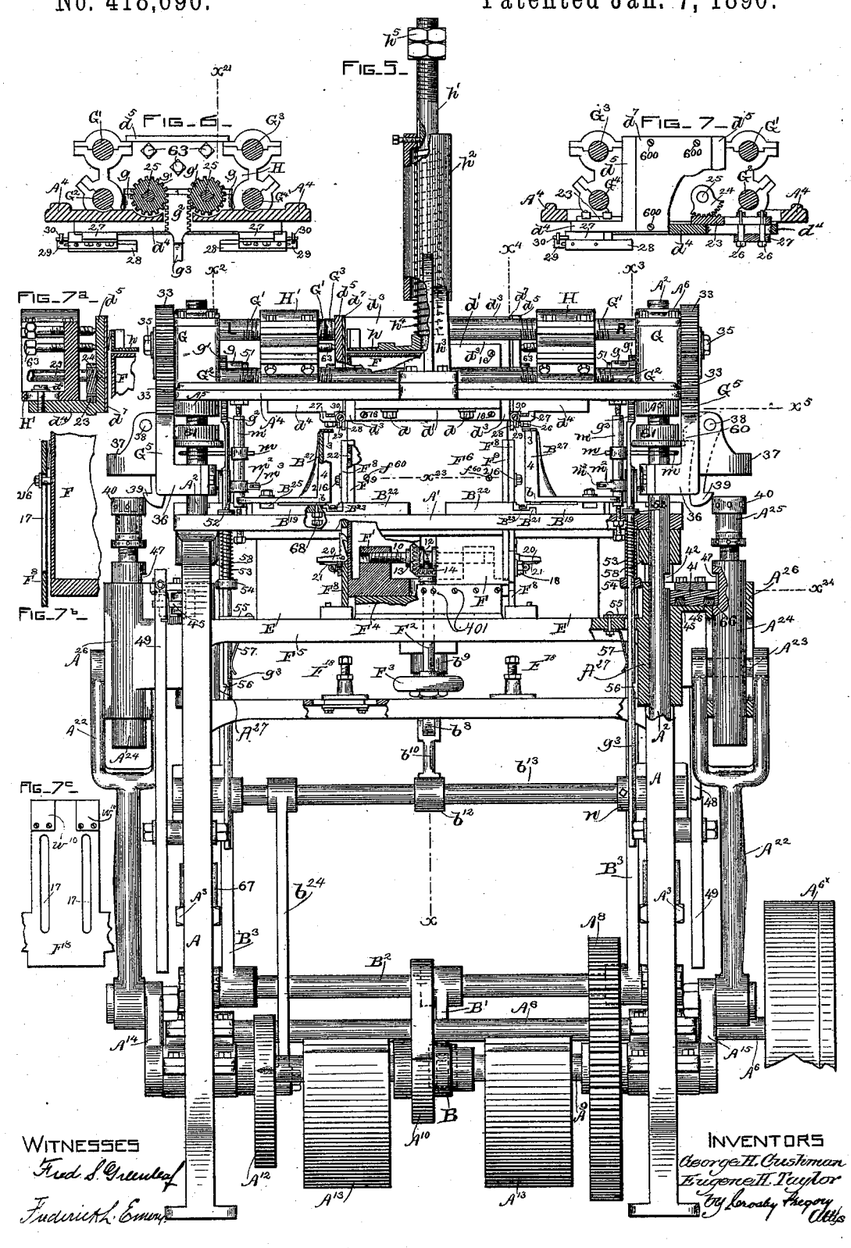
Figure 40:
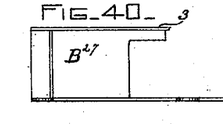
Fig. 40 is a detached view of one of the edge-guides $B^{27}$.

Each plate $B^{19}$ is grooved longitudinally, as at $B^{24}$, to receive in it a slide $B^{25}$, (see Fig. 1,) held in adjusted position by a screw $B^{26}$, each of the said slides having attached to them an edge-guide $B^{27}$, extended vertically upward, as best shown in Fig. 5, and provided at their upper ends with lips 3, which prevent the blank rising above the said edge-guides while being moved from the wetting position into a position above the former, the said lips also acting as stops for the edges of the blank when the latter is about being clamped between the former and the follower, (to be described,) so that the blank at that time occupies a substantially horizontal position. The guide $B^{27}$ is represented at the left of Fig. 5 as partially broken out at one end to better show the lip 3; but in Fig. 1, which is a partial section in the line $x^{23}$, Fig. 5, on the former, it will be noticed that the lip 3 of the guide $B^{27}$ is wholly removed; but said lip and the shape of the guide are shown in Fig. 40. In Fig. 1 the projection shown in section at the outer side of the guide $B^{27}$ is merely a strengthening-rib. The portion of each edge-guide $B^{27}$, near the delivery end of the machine, has a stop-lip 4, (see Fig. 5,) which serves as a stop for the edge 201 of the blank C. The guide $B^{27}$ referred to is shown partially broken away at its top at the left of Fig. 1, so as to expose the stop-lip 4. The guide $B^{27}$ referred to (see Fig. 1) has near its lower end a projecting flange $b$, provided with a raised lip $b'$, the lip forming sort of a track to keep the pasted portion of the blank from contact with the plate $B^{19}$. The bed-plate immediately below the guides described, which position the pile of blanks, is cut away and has secured to it a vat or pan E, which contains the water to be used for wetting the blanks prior to folding the same, the wetting being in the dotted lines shown in Fig. 28. This vat or pan E contains wetting devices, to be described. These wetting devices or wetters, as herein represented, are composed of blocks $b^2$, (shown in longitudinal and in cross section in Fig. 19,) the said blocks being provided at their upper ends with short sections of india-rubber pipe $b^3$, covered with absorbent material—such as cloth—as at $b^4$, to constitute the acting surfaces of the wetters. These blocks $b^2$ are set loosely in recesses in holding-frames $b^5$ $b^6$, made of skeleton shape, as best shown in Fig. 17, the lower edges of the holding-frames $b^5$ being secured by screws $b^{7\times}$ to the bottom plate of a second skeleton frame $b^7$, mounted upon or fixed to a spindle $b^8$, extended up through a stuffing-box $b^9$, attached to the bottom of the vat E, the vertical movement of the said spindle by or through a link, as $b^{10}$, connected to an arm, as $b^{12}$, of a rock-shaft $b^{13}$, causing the wetters to be raised and lowered in the vat E. The holding-frames $b^5$ $b^6$ are further secured to the frame $b^7$ by means of screws, as $b^{14}$, (see Fig. 3,) extended through slotted ears $b^{15}$, extended from the said holders, the skeleton frame $b^7$ having proper screw-holes, as shown at the right of Fig. 3, for the reception of the said screws.

The holders $b^5$ $b^6$ at the bottom of the grooves therein which receive the blocks $b^2$ are provided with an india-rubber pipe, as $b^{17}$, (see Fig. 19,) upon which rest toes 6 of the blocks $b^2$, the said rubber tubing supporting the blocks in a yielding manner, so that the wetters come softly in contact with the paper. The edges of the wetters within the holders are beveled or cut away, as shown in Fig. 19, so as to permit the blocks to rock somewhat and adapt themselves to the irregular surface of the paper-board.

In Fig. 19 it will be noticed that the block $b^2$ at the end of the holder $b^5$ next the holder $b^6$ is provided with a toe 7, which is extended longitudinally into a space in the block $b^2$, mounted in the holder $b^6$, the said toe resting upon the india-rubber tube $b^{17}$ in the holder $b^6$, thus gaining greater elasticity for the end blocks.

The vat E is subdivided to form in it along its opposite sides two paste-receiving vats, as E' E', in which are arranged pasters, which will now be described. Each paster, as herein shown, is composed of a series of blocks $c$, grooved at their upper edges, as best shown in Figs. 20 and 22, the said blocks being shown as slotted or forked to embrace a rubber tube $c'$, mounted upon the longitudinally-grooved upper side of bars $c^2$, notched, as at $c^3$, to keep the blocks in position parallel each with the other or to prevent them from twisting upon the bars. In Fig. 1 we have shown some of these pasters as applied to one of the bars $c^2$, and in practice it will be understood that the bars $c^2$ may be more or less filled up with these pasters, according to the size and shape of the part of the blank to which it is desired to apply the paste.

To paste the blank, as shown in Fig. 28, two of the bars $c^2$ on each side of the machine would have pasters applied to them from end to end nearly. Each bar $c^2$ has at its end an ear $c^4$, (see Fig. 22,) which is extended into a slot of an upright portion $c^5$ of a bottom plate $c^6$, attached to a spindle $c^7$, the lower end of which rests upon an extension $c^8$ of the frame $b^7$, so that the said spindles $c^7$ rise and fall in unison with the frame $b^7$ and with the wetting devices already described. The portion $c^5$ of the bottom plate $c^6$ is chambered to receive spiral springs, as $c^9$, there being one such spring for each end of each bar $c^2$, the ears $c^4$ resting upon the said springs, the bars being retained with their ears in the slots of the portion $c^5$ by means of caps $c^{10}$, through which are extended screws $c^{12}$, the screws entering threaded portions of the upright parts $c^5$ between the chambers receiving the springs $c^9$, rotation of the screws enabling the bars to be depressed more or less against the springs $c^9$, the screws and springs, co-operating together, enabling the tops of the blocks constituting the working parts of the pasters to be placed at the proper level.

In Fig. 20 we have shown a portion of the frame $c^6$ and one of its upright portions $c^5$, the bars $c^{10}$ being broken away, and so, also, in the said figure we have partially shown the rubber tubes, the same being broken away just at the block c to show the arms $c^2$, on which the tubing rests. The pasters rise, as stated, with the wetting devices or wetters, and, passing up through the paste in each paste-box, as E', lift portions of the paste up against the blank above it—viz., the blank at the bottom of the pile of blanks—the said blocks c, or a sufficient number of them, being on the bars $c^2$, applying paste to the blank, as at $c^*$. (See Fig. 28.) The grooved tops of the blocks c retain in them more or less paste, that depending upon the depth of the grooves. The rock-shaft $b^{13}$ before referred to has a second arm $b^{24}$, (see Fig. 5,) having at its lower end a roller or other stud which enters the groove at the inner face of the cam $A^{12}$, before described. The wetters and the pasters operate upon the blank to wet the same and paste it at the proper places, and thereafter the feeder $B^5$ described engages the wet and pasted blank and carries it forward along the tracks referred to into position above the former.

The former (to be described) over which the blank is bent to give shape to the box or cover, whichever is to be made, is composed of several parts, the chief of which are two like hollow blocks F, having threaded lugs F', (see Figs. 5 and 24,) which receive the opposite ends of an adjusting-screw 10, provided at its center with an annularly-grooved collar 12 and with a beveled gear 13, the bevel-gear 13 being engaged and rotated by a bevel-gear 14 at the upper end of a shaft $F^2$, having a hand-wheel $F^3$, by which to rotate the said shaft when it is desired to move the blocks F F from or toward each other in the direction of the width of the machine, according to the length of the box to be made, a projection at the upper end of the said shaft $F^2$ entering the annular groove in the said collar 12 referred to, thus preventing any longitudinal movement of the screw 10 during the adjustment of the blocks F. The lower ends of the blocks F are fitted to slide in suitable grooves or ways in a block $F^4$, fixed to a rising and falling cross-head $F^5$, having at its outer ends suitable socketed portions or sleeves, which embrace and slide on the guide-rods $A^2$, before described. The lower ends of the blocks F are dovetailed in cross-sections (see Fig. 14) to enter a dovetailed guideway in the cross-head, being adjustable by screws 401. (Shown in Fig. 5.) The screws 401 act upon and adjust the gib 460 (shown in section, Fig. 14) as fitting one of the dovetailed sides of the lower end of the blocks comprising the former.

When a box of the minimum size is to be made, the two blocks F F will be brought closely together; but when a box of larger than the minimum size is to be made then the blocks are adjusted one away from the other to leave more or less space between them, thus providing for the length of the box; and to provide for making a wider box we attach to the blocks F F at front and back (see Fig. 25) extension-plates $F^6$, they being attached to the blocks by suitable screws $f^{60}$, extended through suitable threaded holes in the said blocks. The extension-plates $F^6$ will be increased in thickness to give to the former a width suitable for the width of the box to be made, and the said extension-plates will be long enough to extend from the outer edges of the blocks across the open space between them, and preferably each extension-plate will have a ribbed portion to enter and fill the open space, as 15. (See Fig. 25.) Portions of the hollow blocks F, to define the ends of the boxes, have extended therefrom stud-screws 216, having washers (see Fig. 25) under their heads, the said stud-screws receiving upon them and acting as guides for the lip-turner frame $F^8$, (shown separately in Fig. 2,) the said frame being slotted, as at 17, to receive the said stud-screws, the slots being long enough to permit the frame to rise and fall for the proper distance. The frame $F^8$ has adjustably connected to it by bolts 18 in the slots 19 the lip-turners $F^9$. Each frame $F^8$ at each end of the former has a spring-actuated latch 20, shown (see Fig. 5) as an elbow-lever acted upon by a spring 21, it normally keeping the hooked end of the latch in engagement with a notch or recess, as 22, in each block F. The head $A^4$, before described, has attached to its under side (see Fig. 9) in an adjustable manner by screws $d$ side-plate holders $d'$, the said screws entering slots in the said holders, the inner edges of the side plates being extended vertically (see Fig. 14) above and below the portions thereof which are connected with the head $A^4$, and have secured to them by screws 16 (see Fig. 5) the side turners or wipers $d^3$.

The upturned portions $d^5$ of the holders $d^4$ have attached to them by suitable screws 600 (see Fig. 7) the end turning plates or wipers $d^7$, they projecting somewhat from the face of the upright portion $d^5$ sufficiently to enter slightly between the ends of the side turning plates or wipers $d^3$. The holder $d^4$ at its upper side, (see Figs. 7 and 7$^a$,) back of the upright portion $d^5$, is grooved to receive two rack-bars 23, placed in the same line and reciprocated, they being shown in section in the said figures, the teeth of the rack-bar being engaged each by a segment 24 on the shaft 25. Each rack-bar has connected to it by bolts 26 carriages 27, the said bolts being extended through slots in the holder $d^4$, the said carriages being adjustably connected (see Figs. 7 and 12) to lip-turning fingers 28, which co-operate with the lip-turners $F^9$, before described. The lip-turning fingers 28 are shown as made adjustable toward and from the ends of the former by means of a slotted wedge 29, under the control of a screw 30, the threaded shank of the screw entering a threaded hole in the carriage, while the head of the screw enters a slot in the end of the wedge. The rack-bars 23 are also slotted where the bolts 26 are extended through them to permit the adjustment of the rack-bars with relation to the carriages, so as to impart to the lip-turning fingers 28 the proper movements, according to the requirements of the work to be done.

Figures 8, 9, 10, 11, 12, 13:
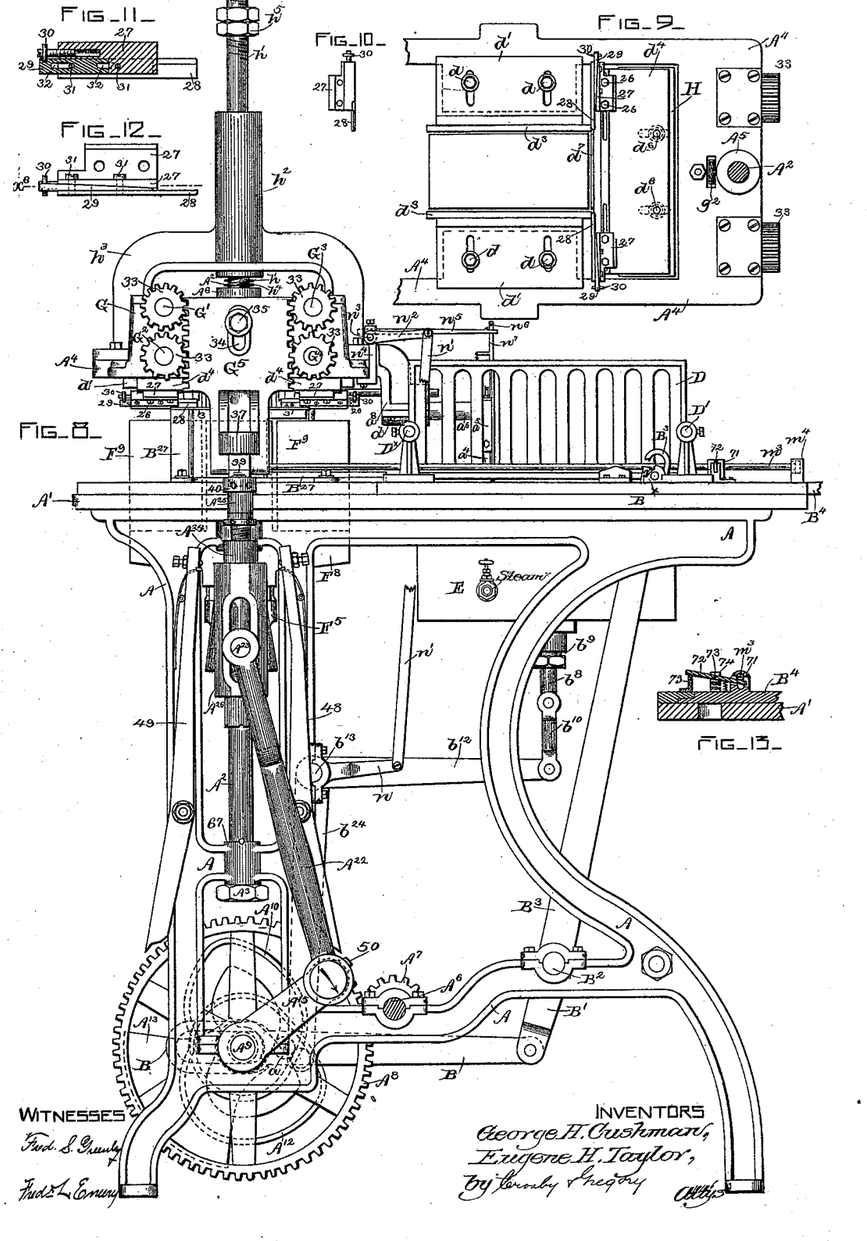
Fig. 8, a left-hand side elevation, viewing the machine from its feeding end at the right of the said figure, the driving-pulley being cut off.
Fig. 9, a partial under side view of the head of the machine, looking upward from about the line $x^5$, Fig. 5, the said figure showing the follower, the two side plates or wipers, and one end plate or wiper with its attached lip-turners and corner-holders.
Fig. 10 shows a corner-turner detached.
Figs. 11 and 12, enlarged views of the same in other positions, Fig. 11 being a section of Fig. 12 in the dotted line $x^6$.
Fig. 13, a sectional detail of the tripping device instrumental in discharging the box from between the follower-plate and former.

In Fig. 9 we have shown but one of the holders $d^4$, the one which should be at the left-hand side of the said figure being omitted to save space on the drawings. The lip-turning fingers 28 have screwed into them screws 31, (see Fig. 11,) which enter the said fingers from a flanged portion of the carriage 27, the screws passing through slots 32 in the adjustable wedge. The head $A^4$ has above it at each end suitable stands G, which receive and properly hold the bearings for four pressure-shafts $G'\ G^2\ G^3\ G^4$, the said shafts being extended entirely across the head, the said shafts at their opposite ends having secured to them like pinions 33, Figs. 1 and 8, all of which are engaged and partially rotated in like manner by like reciprocating racks $G^5$, one at each end of the machine, each rack having a slot, as 34, to receive a guiding stud-screw 35. Each rack-bar at its lower end is provided with a box, as 36, which has a sliding fit upon one of the guide-rods $A^2$, and each rack-bar has an outwardly-extended foot 37, and each rack-bar has pivoted to it at 38 a latch or hook 39. The rack-bars derive their movement through the crank $A^{15}$, before referred to, it having a pin upon which is mounted a connecting-rod $A^{22}$, the upper end of the said connecting-rod fitting a pin $A^{23}$, projecting from a slide-bar $A^{24}$, having at its upper end (see Fig. 5) an adjustable bunter $A^{25}$, provided with a shoulder 40, the said sliding bar having a sliding fit in a sleeve-like portion $A^{26}$ of the sliding cross-head $F^5$, before described.

The sliding cross-head between the sleeve-like portion $A^{26}$ referred to and the sleeve-like portion $A^{27}$ thereof, which has a sliding fit on the guide-rod $A^2$, contains a locking device 41, (shown as a sliding bolt,) the shape of the bolt being best delineated in Figs. 5, 26, and 27. The locking device referred to has at its under side two grooves 43 44, the groove 43 receiving within it (see Fig. 26) one end of a small elbow-lever 45, while the groove 44 receives in it the end of a like elbow-lever 46, the said levers being actuated at the proper times to slide the bolt in one or the other direction, so that one or the other end of the said bolt may enter or leave a notch, as 42, in the guide-rod $A^2$ or the groove 47 in the slide-bar $A^{24}$. The elbow-levers 45 46 are actuated, respectively, by the levers 48 49, one pair of such levers at each side of the machine, the lower ends of the said levers being acted upon by a cam projection 50 at the end of the crank $A^{15}$, (see Fig. 8,) the said cam projections acting in succession upon the beveled lower ends of the said arms 48 49. The holders $d^4$ are connected by screws $d^6$ to the under sides of sliding pressure-blocks $H'$, the said screws $d^6$ entering slots in the said blocks, as shown by dotted lines in Fig. 9 and full lines in Fig. 1, to thus permit the holders to be adjusted horizontally toward and from the former, according to the length of the former. The shafts $G'$ and $G^2$ at the left-hand side of the machine within the pressure-blocks H are provided with right-hand threads, while the like shafts at the right-hand side of the machine within the pressure-blocks $H'$ are provided with left-hand screw-threads. The shafts $G^3\ G^4$ at the left-hand side of the machine within the pressure-block H are shown as provided with left-hand screw-threads, whereas the same shafts at the right-hand side of the machine within the pressure-block $H'$ are provided with right-hand screw-threads, so that as the said shafts in engagement with threaded portions of the pressure-blocks H and $H'$ are rotated they actuate each end of the said blocks positively, moving them backward and forward and with them the holders $d^4$ and their attached parts, previously described, the said pressure-blocks H and $H'$ being moved up against the partially-made box upon the former to thus give it pressure at its ends sufficiently to set the flanged ends 207 of the box firmly to the corner flaps 204, to thus retain the portions of the box in proper position, the extent of movement of the blocks H $H'$ in practice being about one-twelfth of an inch; but this distance may be made or less by adjusting the bunter 40 vertically with relation to the slide-bar $A^{24}$.

The head $A^4$ referred to has erected upon it suitable bearings $g$, (see Figs. 5 and 6,) which receive the sleeve-like hubs of pinions $g'$, the said hubs having at their outer ends collars or projections, as 51, (see Fig. 1,) the inner sides of which are engaged by the caps, which are screwed to and form part of said bearings $g\ g$, the said pinions being free to rotate in the said bearings, but being restrained from longitudinal motion therein. The hubs of these pinions receive through them shafts 25, they being splined with relation to the pinions, so that they may be rotated by the pinions, but yet be moved longitudinally within the pinions and follow the movements of the pressure-blocks H $H'$ and also permit of the adjustment of the plates $d^4$, as before described. The outer ends of these shafts 25 are reduced and take bearing in the upturned portion $d^5$ (see Fig. $7^a$) of the holder $d^4$, each shaft having attached to it one of the sectors 24, before described, for moving the rack-bars 23. The gears $g'$ referred to are actuated to oscillate the shafts 25 for the proper distance by means of a double rack $g^2$, one between each pair of gears $g'$ at opposite sides of the machine, the said racks being attached to a vertically-reciprocating slide-rod $g^3$, extended loosely through a hole in the bed $A'$ of the machine, as shown best at the right-hand side of Fig. 5, the said slide-rod having upon it a collar 52, which is normally kept seated against the top of the bed $A'$ by a spring 53, one end of which acts against the under side of the said bed A', while the opposite end of the spring rests on a collar 54, attached, preferably, in an adjustable manner to the slide-rod $g^3$, the said slide-rod being also extended through a catch 55 on the cross-head $F^5$ and also through a hole in the said cross-head, the slide-rod $g^3$ being also provided with a notch, as 56. A spring 57, attached to the cross-head and acting upon the slide-bar $g^3$, normally presses the same in a direction to cause its notch 56 to engage with the catch 55.

In the drawings the cross-head is shown as nearly in its most elevated position; but when it was in its lowest position the catch 55 was at some distance below the notch 56. When the cross-head $F^5$ was being lifted from its lowest position and the box was partially completed, sufficiently to insure the turning over of not only the corner flaps, but also the sides, the catch 55 arrived in position opposite the notch 56, and thereafter in the further rise of the cross-head $F^5$ the slide-bar $g^3$ was raised in unison with it to actuate the rack-bar $g^2$, rotate the shafts 25, move the racks 23, and actuate the lip-turning fingers 28 to hold the corner flaps 204 closely against the corners of the former while the end flaps 207 of the box were being brought down far enough to catch the said corners when the said lip-forming fingers were withdrawn. This withdrawal was effected by the bevel-edge of the collar 54 striking the bevel-edge 58 of a portion of the frame-work, the rod $g^3$, by the contact of the collar 54 with the said frame-work, being pushed against the action of the spring 57 and out of engagement with the catch 55, so that the spring 53 immediately threw the rack-bar down until the collar 52 struck the bed A' of the machine, in which condition the lip-turning fingers 28 were moved to occupy their farthest position away from each other. The space left between the side turners or wipers $d^3$ and the end turners or wipers $d^7$ is filled by a follower $h$, and in practice the area of the followers will be slightly larger than the area of the former, the difference in area being usually about one thirty-second of an inch. This follower is attached to the lower end of a slide-rod $h'$, extended through a sleeve $h^2$, forming a fixed part of a yoke $h^3$, which in turn forms a fixed part of the head, the said sleeve receiving within it about the slide-rod $h'$ a spiral spring, as $h^4$, which normally acts to keep the follower pressed down against the top of the former, the lowest position of the follower being, however, determined by the arrival of an adjustable nut, as $h^5$, against the top of the sleeve $h^2$, the descent of the follower being stopped at a point just below the devices attached to the under side of the head, so as to leave a free space between the follower and former for the reception of the blank to be made into a box or cover and so as to enable the said blank to be firmly clamped between the former and follower as the latter rises just before or as the side and end journals and side and end wipers operate to bend the blank, thus preventing any twisting of the blank while being folded into shape. The cross-head $F^5$ and former continue to rise from the position Fig. 5, lifting the follower by the direct pressure of the box against its under side until the locking-bolt 41 enters the notch 42 in the guide-rod, when the ascent of the cross-head is arrested, and with it the former and box; but the slide-bar $A^{24}$ continues to rise until the bunters $A^{25}$ strike the projections 37 and lift the said rack-bars $G^5$ to move the pressure-blocks, as described, the projections 40, in the descent of the slide-bars $A^{24}$, engaging the hooked latches 39 and pulling the said rack-bars $G^5$ down, thus restoring the pressure-blocks to their normal positions, the hooked latches 39 being, however, released automatically from the said shoulders 40 of the bunters, when the rack-bars have been moved into their proper or starting positions, by the contact of a projection, as 60, (shown by dotted lines, Fig. 5,) on the said hooked latches striking a projection on adjustable nuts 61, applied to the guide-rods $A^2$.

To prevent the end turning plates or wipers from springing back unduly or twisting out of shape when subjected to pressure, they are backed up or supported by screws 63, three of which are shown, (see Figs. 1 and $7^a$,) they being adjustable in upright portions of the said pressure-blocks H H'.

Figure 30:
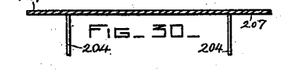
Fig. 30, a section of Fig. 29.
Figure 31:
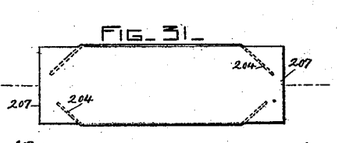
Fig. 31 shows the sides turned or wiped down.
Figure 32:
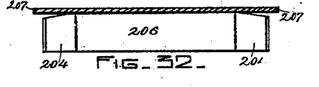
Fig. 32, a section of Fig. 31.

In operation a series of blanks notched substantially as in Fig. 28 are placed between the guides D D, with their front and rear ends against, respectively, gages $a^3$ and the gage $a^4$, the lowermost blank of the pile of blanks resting upon the tracks $a'$ $B^{12}$, the said tracks being divided into sections in the direction of their length, as before described, so as to permit the wetters to pass up between them. Viewing Fig. 14 it will be seen that the short-section track $a'$ between the wetters is supported by uprights 62, standing in the vat E, while the end portions of the said track next the portions supported by the said uprights 62 are sustained by screw studs or pins 601, carried at the upper ends of screws 63, extended loosely into posts 64, standing in the said vat, the said screws receiving upon them nuts, as 65, which rest on the posts 64, rotation of the nuts enabling the ends of the track so supported to be adjusted vertically to the proper height, so as to be in proper line or level with the outside tracks $B^{12}$. The pins 601 enter slots 602. The drawings show the machine with the feeder as having nearly completed its back stroke preparatory to again being moved forward to engage the undermost blank of the pile and feed it forward into position between the former and the follower; but prior to the forward movement of the feeder the wetting devices will be raised to wet the under side of the blank in the dotted lines shown in Fig. 28, where it is to be folded, thus slightly moistening the paper-board to prevent the same cracking. The wetters, by the movement of the actuating parts, also lift the pasting devices to apply paste to the end flap or flange of the paper box or cover, as shown in Fig. 28. The paper-board blank, having been wet and pasted, is moved forward by the feeder under the gage $a^4$ and between it and the space referred to, the space being just sufficient to permit one blank to be so fed forward, the feeder carrying the blank forward until its leading end 201 meets the lip 4, before referred to, which serves as a stop for the blank. When the cross-head $F^5$ is in its lowest position, the lower end of the sleeve-like portion $A^{26}$ rests upon the shoulder 67 of the frame-work. By the time that the blank arrives at the lip or stop 4 the former commences to rise, the crank $A^{15}$ at such time having passed its lowest center sufficiently to raise the shoulder 66 of the slide-rod $A^{24}$ against the outer end of the bolt 41, and thereafter the cross-head commences to rise from its lowest position in unison with the slide-bar $A^{24}$, the said cross-head being lifted and carrying up with it the former until the bolt or locking device 41 arrives in position opposite the notch 42 in guide-rods $A^2$, when the cam projection 50 on the crank $A^{15}$ meets the lower end of the lever 49, it being beveled, as shown in Fig. 8, turning the said lever 49 and moving the lever 45 in a direction to cause the bolt or locking device to enter the said notch to cause the cross-head to be locked in position, the said bolt being held in the said notch by the upper portion of the sliding bar $A^{24}$ below its shoulder 66, the said bar $A^{24}$ continuing to rise to elevate the rack-bars $A^5$ and move the parts to be actuated by it, as before described, while the cross-head remains at rest. As the cross-head rises, it lifts the former F, and with it the lip-turner-carrying frame $F^8$. The former carries up with it the wetted and pasted blank, which has been fed forward with its leading end against the lip or stop 4, and carries the said blank up to meet the under side of the follower $h$, the ends of the blank during such time acting against the gages $B^{27}$ and arriving against the overhanging lips 3 just as the blank is to be clamped between the former and the follower, so that the blank at such time is in a practically-horizontal position, and also in the proper position with relation to the former to be folded in the desired lines. As soon as the blank is brought up against the under side of the follower the latter begins to rise through the action of the blank being carried up by the former. After the blank has been clamped, as described, between the follower and former, the upper ends of the lip-turners $F^9$, which then stand at the level of the top of the former, but which project forward and backward of the former, and practically form, as it were, movable extensions of the former, the said lip-turners supporting the portion of the blank from the point 203 to 203, move the blank against the lip-turning fingers 28 and crease the blank or fold it to turn down the lips 204 thereof, leaving them in the condition shown in Figs. 29 and 30, which done, the outwardly-extending arms of the latches 20 strike an adjustable stop 68 and are turned to release the said hooks from the openings 22 in the former to permit the lip-turners to drop by gravity. The former, as it continues to rise, brings the blank against the side turners or wipers $d^3$ $d^3$, creasing the blank C along the dotted lines 205, (see Fig. 29,) turning the side pieces 206 of the blank, its lips 204 having been previously turned into contact with the sides of the former, leaving the said side flaps 206 in the condition shown in Figs. 31 and 32, and immediately thereafter, the former continuing to rise, the slide-rod $g^3$ is lifted, as before described, to actuate the carriages 27 and cause the lip-turning fingers 28 to move toward each other and to cross the ends of the former, the said lip-turning fingers engaging the corner flaps 204 of the blank and moving them from their position, Figs. 31 and 32, against the ends of the former, holding them there until by the further rise of the former the end flaps 207 of the blank are brought against the end turners or wipers $d^5$ and turned down from the position Figs. 31, 32, and 33 in the direction of the dotted line into the position Fig. 34, until the said end flaps 207 catch and hold the corner flaps 204, when the corner-flap fingers are quickly thrown back away from the corner flaps, so that in the further rise of the former the said end flaps are brought down against the corner flaps and against the end of the former, at which time the bolt 41 enters the notch 42 in the guide-rods $A^2$, as stated, and effectually locks the cross-head $F^5$ and former in their most elevated position. After this the continued rise of the slide-bar $A^{24}$ actuates the rack and the shafts $G'$ $G^2$ $G^3$ $G^4$, as described, to move the former, the slide-block H H' to press, as described, the ends of the box closely against the corner flaps and set and hold the paste previously applied to the end flaps 207, thus completing the box. The box having been completed, the slide-bar $A^{24}$ commences to descend, the shoulder 40 of the bunter being in engagement with the hook 39, thus pulling down the rack-bar $G^5$ until it is automatically released, as before stated. Immediately as the hooks 39 are released the cam projection 50 meets the beveled lower end of the lever 48, causing it to act upon the lever 45, turning it in a direction to move the bolt or locking device 41 out from the notch 42 and into the notch 47 in the bar $A^{24}$, so that the shoulder 66 of the said notch in the descent of the bar $A^{24}$ may catch the outer end of the bolt and thereafter take down in unison with it the cross-bar $F^5$ and its attached former. The former continues to descend, taking with it the completed box, the follower following in contact with the box until the nut or stop $h^5$ reaches the top of the sleeve $h^2$, when the box is unclamped. During the further descent of the former the sides and ends of the box come against the plates $B^{22}$, before described, arranged about the former on the bed of the machine, the said plates $B^{22}$ stopping the box while the former continues to descend, the former being withdrawn from the box, leaving the box standing upon the side plates $B^{22}$. The box must now be discharged from the machine, and to do this the ejectors $m$, one of which is fully shown by full and dotted lines at the left of Fig. 1, are thrown around from opposite sides of the machine, striking the box and throwing it out at the delivery end of the machine, this being done at the same time that the feeder is acting to carry forward a wetted and pasted blank. Each ejector $m$ is carried by a rock-shaft $m'$, having an attached arm $m^2$, to which is joined a link or slide-rod $m^3$, the outer end of the said slide-rod being normally held against the stop $m^4$ on the frame of the machine by a spring, as 70, connected to the arm $m^2$ and to one of the shafts $D^\times$. The feeder-frame (see Figs. 1 and 13) has a bearing 71, through which is extended the slide-rod $m^3$, the said slide-rod having at its under side a notch, which is entered by a lever-latch 72, pivoted on a stand 74, also erected on the feeder-frame $B^4$. When the latch 72 is in engagement with the slide-rod $m^3$ and the feeder is started forward, the said latch, engaging the slide-rod, carries it forward with it and turns the ejectors $m$ around to strike the box and discharge it from the machine; but as soon as the outer end of the latch arrives in contact with the wedge or cam 73, attached to the frame, the said latch is turned to release the slide-rod, so that the spring 70 immediately acts to throw the slide-rod back against the stop $m^4$ and throw the ejectors out into the position shown in Fig. 1. The rock-shaft $b^{13}$ has an arm $n$, to which is jointed a link $n'$, (shown broken out in Fig. 8,) the said link being jointed at its other end to an arm $n^2$ of a rock-shaft $n^3$, held in bearings $n^4$ of the head $A^4$. The rock-shaft $n^3$ has a secured arm $n^5$, (see Figs. 38 and 39,) which at times rises and strikes a pin $n^6$, in a sliding separating or presser bar $n^7$, having at its lower end, next the pile of blanks C, a lip (see Fig. 38) to enter between the said blanks, the said bar acted upon by a spring $n^8$, serving to hold down-upon the center track $a'$ the blanks under the said lip. The spring $n^8$ acts to normally tip the bar $n^7$ slightly in its bearings, so as to cause the lip $w^{10}$ to press against the blanks. When the arm $n^2$ is turned to lift the bar $n^7$, the cam portion $n^{10}$ thereof, just above the lip $w^{10}$ at the lower end of the said bar, (see Fig. 38,) meets a pin $n^{10}$, which causes the bar to be moved in the direction to remove the lip from between the blanks, the lip entering, however, between other blanks after the spring $n^8$ is again permitted to act to throw the bar $n^7$ down. The bearing $a^8$ (see Fig. 14) has adjustably connected to it by a screw $w$ a rod $w'$, which supports a presser $w^2$, which lies directly above the track $a'$, the adjustment of the presser vertically enabling just sufficient space to be left between it and the track $a'$ for the passage of the blank being fed by the feeder out from between the guides and under the gage $a^4$, the said presser preventing the central portion of the wet blank from rising or bulging up on its way to the former.

The machine herein described has been provided with devices for adjusting most of its parts to thus adapt one and the same machine for the manufacture of boxes of many different sizes both as to width and to length, and therefore the presser described has a prolongation $w^3$, which enters telescopically one end of the portion $w^2$, the opposite end of the portion $w^3$ extending from a vertical rod $w^4$, which is in turn connected to a slide-rod $w^5$, made adjustable in the bearing $a^8$ and held in adjusted position by a set-screw $w^6$. The lower end of the portion $w^\times$ is provided with a spring $w^7$ (see Fig. 18) to prevent any retrograde movement of the blank as the feeder retires from it. The portions $w^2$ and $w^3$ might be screwed together, and the portion $w^2$ slipped in the split lower end of the rod $w'$, the set-screw shown in the said rod being rotated to cause the rod to exert more or less friction upon the presser-rod $w^2$. The paste-pans $E'$ are (see Fig. 15) supported on short transverse webs $E^{20}$ of the tank E, screws $E^{21}$ holding the paste-pans in place, the said screws (see Fig. 1) entering slots in flanges projected from the ends of the paste-pans to enable them to be adjusted laterally to the tank to accommodate for different lengths.

We find it quite essential in the practical operation of our machine that the water used in the tank E shall be warmed, as thereby it more quickly penetrates paper, and to this end we have shown a pipe, as $w^{12}$, (see Fig. 17,) by which to introduce steam or hot water, and the vat has an overflow-pipe $w^{13}$; but instead of heating the said water by the means just described we might employ a lamp at $w^{14}$ of any usual construction.

To prevent the steam or vapor arising against the lowermost blank of the pile of blanks, we prefer to add to the vat E, as shown only in Fig. 23, two covers or boards $w^{16}$ $w^{16}$. As the cross-bar $F^5$ is descending, the lip-turner frame $F^8$ meets the stops $F^{18}$ and arrests the same, and when the former has descended sufficiently to bring the notches 22 therein opposite the catches 20 the said catches enter the said notches to thus enable the former as it again rises to lift with it the lip-turner frame.

It will be noticed that the former composed of two independent blocks has combined with it an adjusting mechanism, (shown as a threaded screw-shaft,) the relation of which moves each part of the former a like distance. We do not desire, however, to limit our invention to the exact form of adjusting devices shown, as we may employ instead other well-known equivalent devices, whereby both parts of the former may be moved in like manner.

In Fig. 7ᵃ we have shown a scraper as connected to the follower to scrape the end plates or wipers; but we do not herein claim such scrapers, as they are made the subject of claim in another application, Serial No. 298,212, filed January 31, 1889.

The lip-turners $F^8$ (see Fig. 7) have at their inner sides spring-plates $w^{10}$, (see Fig. 7ᶜ,) attached thereto by suitable screws, the said plates acting against the ends of the former F and scraping therefrom any paste which may adhere thereto.

We claim—

1. In a machine for the manufacture of paper boxes, the following instrumentalities, viz: guides to position the blanks to be made into a box or cover, and wetters to wet the blank in the lines in which it is to be folded, and a former and a follower-plate both located at a distance from the said guides and wetters, and pasting mechanism to paste the blank, combined with feeding mechanism to feed the wet blanks from the wetters into position between the said former and follower-plate, substantially as described.

2. In a machine for the manufacture of paper boxes, a movable follower-plate $h$, the surrounding head, adjustable plates $B^{22}$, to support the blank below the follower-plate, means to adjust the said plates, and feeding mechanism to place the blank between the follower-plate and former, combined with a reciprocating former and means to move it to take the blank from the plates on which it rests and impinge it against the follower-plate, and with lip-turners and side and end flap wipers, to operate substantially as described.

3. In a machine for the manufacture of paper boxes, the former, means to move it during the operation of shaping the box, the movable follower-plate against which the blank is clamped, the lip-turners located at each end of the former, and independent lip-turning fingers, combined with stationary side and end plates or wipers, to operate substantially as described.

4. In a machine for the manufacture of paper boxes, guides to position the blank and separate tracks to support the blank between its ends, combined with a series of wetters independent of each other, yielding supports therefor, and means to move the said wetters intermittingly toward and from the said tracks and blank thereon to come in contact with and to wet the blank on the lines where it is to be folded, substantially as described.

5. In a machine for the manufacture of paper boxes, the tracks to support the blank and the box to contain a fluid and located below the said tracks, combined with the wetters made movable up through the liquid in said box and against the said blank, substantially as described.

6. In a machine for the manufacture of paper boxes, independent narrow tracks to support the blank, combined with the independent wetters, means to move them intermittingly to cause them to wet the blank in the lines upon which it is to be folded, and with independent series of rocking pasting devices, one of said series located near each end of the blank to paste the same outside the lines where the blank was wet, substantially as described.

7. In a machine for the manufacture of paper boxes, tracks to support the blank to be wet, combined with wetters arranged parallel, or substantially so, to each other both in the direction of the width and length of the blank to wet the same near its opposite edges in the direction of the length and of the width of the blank, and with means to adjust the said wetters toward and from each other, substantially as described.

8. In a machine for the manufacture of paper boxes, a series of wetters each composed of independent beveled or cut-away blocks having textile-covered faces to act against the blank to be wet, combined with frames to receive and move the said blocks, substantially as described.

9. In a machine for the manufacture of paper boxes, a series of wetters provided with india-rubber tubing and having a textile covering outside the said tubing, substantially as described.

10. In a machine for the manufacture of paper boxes, the holders $b^5$ and the rubber tubes $b^{17}$ therein, combined with the wetters $b^2$, resting thereon, and with the wetting-faces $b^4$, to operate substantially as described.

11. In a machine for the manufacture of paper boxes, the reciprocating frame $c^5\ c^6$ and its bars $c^2$, combined with the independent loosely-supported pasters $c$, substantially as described.

12. In a machine for the manufacture of paper boxes, the frame $c^5\ c^6$, the bars $c^2$, and the flexible support $c'$, combined with the pasters $c$, to operate substantially as described.

13. In a machine for the manufacture of paper boxes, tracks to support the blank, a tank E crossed by the said tracks, a movable frame, as $b^7$, and a spindle, as $b^8$, connected thereto and extended out through the said tank, combined with the holders $b^5\ b^6$, the wetters $b^2$, having faces $b^4$, and with means to operate the said spindle, substantially as described.

14. In a machine for the manufacture of paper boxes, guides to position a blank to be wet, wetters to wet the blank, and a gage to prevent more than one blank being fed forward at one operation of the machine, combined with a feeder to strike against the rearmost edge of the blank and feed it away from and beyond the wetting devices, substantially as described.

15. In a machine for the manufacture of paper boxes, the former composed of independent hollow portions F F, having threaded lugs F', combined with the cross-head F⁵, a double screw entering the said lugs and provided at its center with an annularly-grooved collar, a projection to enter the said groove and prevent longitudinal movement of the said screw, and means to rotate the said screw, whereby the said former may be adjusted according to the length of the box, substantially as described.

16. In a machine for the manufacture of paper boxes, the plates $B^{22}$, the cross-head, the two-part former, guides therefor and means to adjust the said former, and the movable follower-plate $h$, combined with independent shouldered extension-plates $F^6$, to operate substantially as described.

17. In a machine for the manufacture of paper boxes, the former and the loosely-connected lip-turner frame $F^8$, combined with the attached lip-turners and means to adjust the said lip-turners on the said frame, substantially as described.

18. In a machine for the manufacture of paper boxes, the former, notched at 22, and the lip-turner frames having catches 20, combined with the lip-turners and with the stops to disengage the catches, substantially as described.

19. In a machine for the manufacture of paper boxes, the head $A^4$, the adjustable holders $d^4$, end wipers $d^7$, and pressure-blocks, combined with the former and with means to cause the pressure-blocks to move the end wipers toward and from the ends of the former, substantially as described.

20. In a machine for the manufacture of paper boxes, pressure-blocks H H' and right and left threaded shafts in engagement therewith, combined with rack-bars to actuate the said shafts in unison, substantially as described.

21. In a machine for the manufacture of paper boxes, the former, the lip-turners, and lip-turning fingers and carriages to which they are adjustably attached, combined with gears to reciprocate the said carriages and lip-turning fingers, substantially as described.

22. In a machine for the manufacture of paper boxes, the tracks to support, near its ends and central part, the blank to be wet, and a gage, as $a^4$, to permit the forward movement of but one blank at a time, combined with the independent wetters and with the feeder having a slot to span one of the said tracks, substantially as described.

23. In a machine for the manufacture of paper boxes, the tank E and the paste-pans therein, combined with screws to hold and permit the adjustment of the paste-pans for boxes of different lengths, substantially as described.

24. The independent tracks $a'$ and $B^{12}$, the track $a'$ being made in sections and having a short section above the pan E to support the blank, and wetters arranged parallel, or substantially so, to each other, both in the direction of the width and length of the blank, combined with a pan and with pasters arranged outside the wetters which wet the blank in the direction of its width, and with means to actuate the wetters and pasters, substantially as described.

25. In a machine for the manufacture of paper boxes, tracks to support the blanks to be wet preparatory to folding the same, a tank, and wetters therein, combined with means to heat the water in the said tank, substantially as described.

26. In a machine for the manufacture of paper boxes, the tracks $B^{12}$, to support the blank, and the plates $B^{19}$, combined with the lips $b'$, located near their outer sides to support the pasted ends of the blanks and keep them from the plates $B^{19}$, substantially as described.

27. In a machine for the manufacture of paper boxes, the former F F and the bed-plate A', combined with the adjustable plates $B^{19}$ and the plates $B^{22}$, attached thereto, substantially as described.

28. In a machine for the manufacture of paper boxes, the tracks to support the blank and the former and the feeder to feed the blank into position to be acted upon by the former, combined with the guides $B^{27}$, having the lips 3, to operate substantially as described.

29. In a machine for the manufacture of paper boxes, the tracks to support the blank and the former and the feeder to feed the blank into position to be acted upon by the former, combined with the guides having the lips 3 and having the stop-lips 4, substantially as described.

30. In a machine for the manufacture of paper boxes, wetters to wet a blank and the former and tracks to support the blank and the feeder, combined with the presser-rod $w^2$ $w^3$, located between the said wetters and the former to keep the blank down on the said tracks on its way from the wetters to the said former to be folded, substantially as described.

31. In a machine for the manufacture of paper boxes, a former, a follower-plate, and plates outside the former to support the edges of the box while the former is withdrawn from it, combined with an ejector to remove the box from between the said supporting-plates and the follower-plate, substantially as described.

32. In a machine for the manufacture of paper boxes, a former, a follower-plate, a feeder to feed a blank into position between the said former and follower-plate, and supporting-plates to sustain the box after its removal from the former, combined with the ejector, the actuating-rod $m^3$, feeder-frame carrying the feeder, the pivoted latch 72, to engage the said rod, a cam or projection to actuate the said latch to release the said rod, and a spring to move the said ejector, substantially as described.

33. In a machine for the manufacture of paper boxes, the cross-head $F^5$, the sleeves $A^{27}$, the notched rods $A^2$, to guide the said sleeves and cross-head, and the former carried by the said cross-head, combined with the locking-bolts and the slide-bars $A^{24}$, to operate substantially as described.

34. In a machine for the manufacture of paper boxes, the former, the presser-blocks, the right and left threaded screws, the attached gears, and the racks and the latches attached thereto, combined with the slide-bars having the bunters, to operate substantially as described.

35. In a machine for the manufacture of paper boxes, the former, the presser-blocks, and the holders $d^4$, having uprights $d^5$ and attached end wipers $d^7$, combined with the backing-up screws to prevent the springing of the uprights $d^5$, substantially as described.

36. In a machine for the manufacture of paper boxes, the cross-head $F^5$, the former having the notches 22 therein, the lip-turner frames loosely connected thereto, and the latches, combined with the stops $F^{18}$, to operate substantially as described.

37. In a machine for the manufacture of paper boxes, the former, the lip-turning fingers, the sliding carriages to which they are connected, the sectors 24, shafts 25, their attached gear, and rack-bar $g^2$, combined with the notched slide-rods $g^3$ and their springs and beveled collars, to operate substantially as described.

38. In a machine for the manufacture of paper boxes, the cross-head $F^5$, the guide-block $F^4$, the two-part former F F thereon, the screw 10, connected to each part of the former, and the rod $F^2$, combined with intermediate gears to operate the said screw, substantially as described.

39. In a machine for the manufacture of paper boxes, the former, the side and end wipers, and the follower-plate having the shank $h'$, combined with the spring and with the adjustable nut to limit the descent of the follower-plate, substantially as described.

40. In a machine for the manufacture of paper boxes, the former, the holder-plates $d^4$, the sliding carriages 27, and the lip-turning fingers, combined with means, as wedges, to adjust the said fingers toward and from the former in the direction of the length of the box, substantially as described.

41. In a machine for the manufacture of paper boxes, wetters to wet the paper in the lines where it is to be folded and a former and follower located at a distance from the wetters, combined with feeding mechanism to move the wet paper from the wetters into position between the said former and follower to be folded on the lines in which the paper was wet, substantially as described.

42. Tracks to support a blank and independent wetters arranged parallel, or nearly so, to each other both in the direction of the length and breadth of the blank to act upon the blank between the said supporting-tracks, combined with means to move the said wetters toward and from the said blank supported on the said tracks, substantially as described.

43. In a machine for the manufacture of paper boxes, guides to receive and support a pile of blanks, tracks to support the endmost blank of the pile, a gage to act as a stop and prevent the movement horizontally of any but the endmost blank, wetters to wet the endmost blank along the lines in which it is to be folded, pasting devices to paste the said blank, a feeding mechanism to act upon the edge of a wet blank, and a former and a follower-plate, the said feeding device carrying the said wet blank into position to be folded, substantially as described.

44. In a machine for making paper boxes, the supporting-plates $B^{22}$ for the box-blank to be folded, edge-guides $B^{27}$, attached thereto and provided at their upper ends with lips 3, a former made movable between the said plates, feeding mechanism to place the blank on the said plates above the former, and a stationary head $A^4$, having side and end wipers or plates adjustably attached thereto, combined with a movable follower-plate $h$, opposed to the said former, and with means to move the former, the follower-plate and the former with the box-blank clamped between them entering the box-blank into the space between the said side and end plates or wipers, substantially as described.

45. In a machine for making paper boxes, the supporting-plates $B^{22}$ for the box-blank to be folded, edge-guides $B^{27}$, attached thereto and provided at their lower ends with the raised lips $b'$, a former made movable between the said plates, feeding mechanism to place the blank on the said plates above the former, and a stationary head $A^4$, having side and end wipers or plates attached thereto, combined with a movable follower-plate $h$, opposed to the said former, and with means to move the former, the follower-plate and the former with the box-blank clamped between them entering the box-blank into the space between the said side and end plates and wipers, and with lip-turners, substantially as described.

46. In a machine for making paper boxes, plates to support the blank to be folded, the former vertically movable with relation to the said support, feeding mechanism for the blank, and the pressure-blocks, combined with the right and left screws, their attached gears, and with means to rotate the said gears, substantially as described.

47. The tracks to support the blank near the lines where it is to be wet in the direction of its width and wetters, combined with the paste-tanks and a series of independent pasters and means to support them loosely in order that they may tip and adapt themselves to the inequalities of the blank outside the lines at which the wetters wet the blank, substantially as described.

48. In a machine for the manufacture of paper boxes, the tank E, the track $a'$, having a short section located above the said tank, and the tracks $B^{12}$, located beyond but separated from the track $a'$ by a space, combined with wetters arranged parallel to each other at right angles to the said track $a'$, and with means to actuate the said wetters and cause them to rise at each end of the short section of the track $a'$, and also between the tracks $a'$ and $B^{12}$, substantially as described.

In testimony whereof we have signed our names to this specification in the presence of two subscribing witnesses.

GEO. H. CUSHMAN.
EUGENE H. TAYLOR.

Witnesses:
G. W. GREGORY,
A. S. WIEGAND.